Sept. 23, 1941.  W. K. WALKER  2,256,797
TEMPERATURE CONTROL SYSTEM
Filed April 19, 1938 2 Sheets-Sheet 1
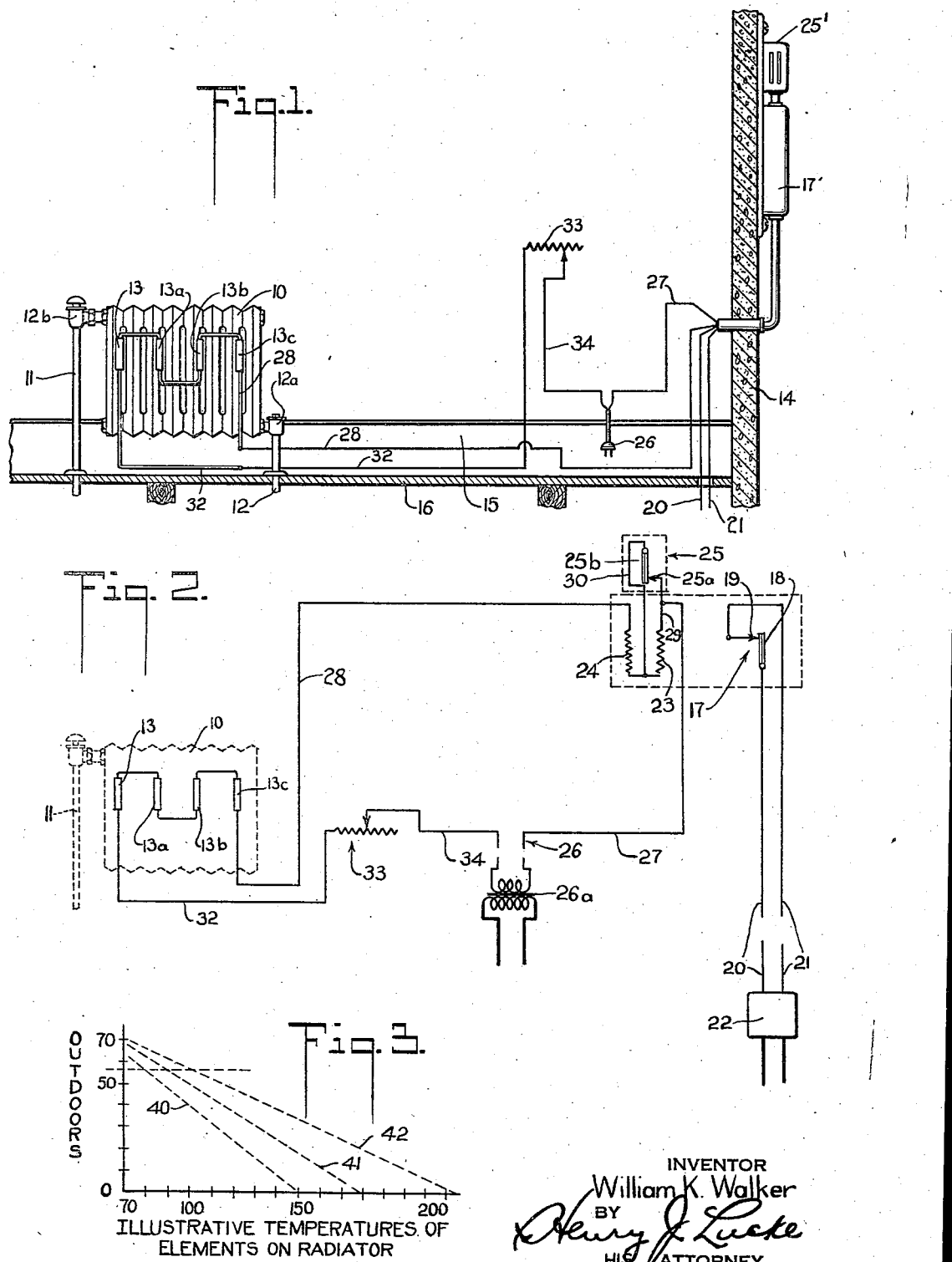
INVENTOR
William K. Walker
BY
Henry J. Lucke
HIS ATTORNEY Sept. 23, 1941.    W. K. WALKER    2,256,797
TEMPERATURE CONTROL SYSTEM
Filed April 19, 1938    2 Sheets-Sheet 2
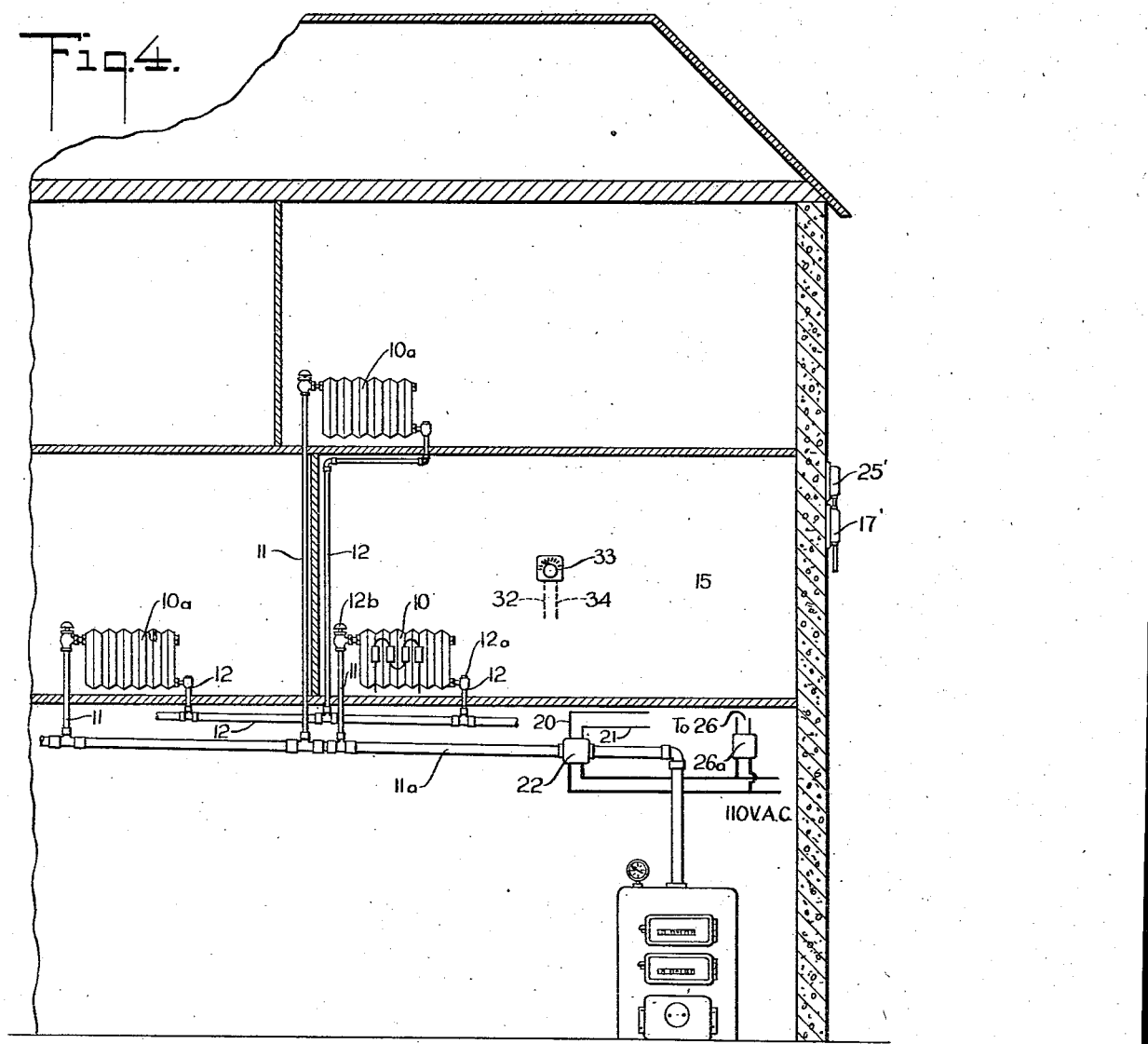
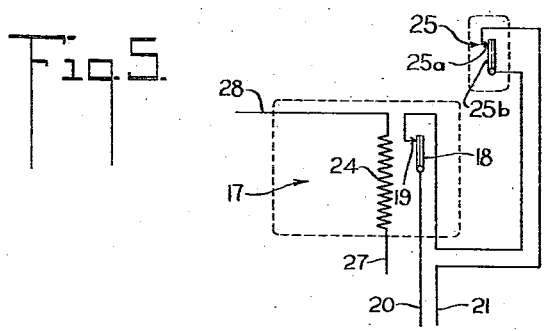
INVENTOR
William K. Walker
BY
Henry J. Lucke
HIS ATTORNEY Patented Sept. 23, 1941

2,256,797

UNITED STATES PATENT OFFICE 2,256,797

TEMPERATURE CONTROL SYSTEM

William K. Walker, New York, N. Y., assignor, by mesne assignments, to American Radiator & Standard Sanitary Corporation, New York, N. Y., a corporation of Delaware Application April 19, 1938, Serial No. 202,845

10 Claims. (Cl. 236—91)

My present invention relates to improved means and method of regulating heating systems.

A characteristic of the present invention resides in the control of the supply of thermal medium to effect any desired temperature within a building or other structure equipped with a suitable thermal system, in correlation with variant outdoor, i. e., weather temperatures.

Pursuant to the invention, control of the instants of starting and shutting off of the supply of the thermal medium is accomplished by a novel combination of a thermostat responsive to outdoor temperature and asserting control over the shutting off or supply of said thermal medium, means disposed in heat radiating relation with said thermostat and operative to supplement the outdoor temperature in attaining a predetermined operation temperature of said thermostat, and means associated with a radiator or other element of the building thermal system to control the amount of heat output of said thermostat-associated heat radiating means.

Preferably, the thermostat-associated heat radiating means are electrical heating coils or equivalent units, the heat output of which is controlled by altering the total resistance of the electrical circuit in which such heating elements are placed. Most preferably, such control of the reistance is effected by including, as part of such electrical circuit, electrical conducting materials in which the electrical resistance varies appreciably with temperature, and disposing such materials in heat-exchange relationship to a selected radiator of the heating system, or other heat-exchange or heat-conducting means thereof. The heat supply to such radiator or the like serves as the basis for the heat supply to other heat exchangers of the system in maintaining the desired temperature condition within the building or other enclosure served by such system.

It is thus a feature of the present invention that the supply of heat to a building or other enclosure is governed by a correlation of the outdoor temperature and the temperature of a controlling radiator.

It is a second feature of the present invention that the supply of heat to a building, as established by the supply of heat medium to a selected "controlling" element, may be regulated by, and maintained in desired relationship to, the outdoor temperature, the supply of heat medium to the control radiator being lesser or greater as the outdoor temperature rises or falls. The condition known as "cold 70" in the heating art, such condition being a common result of controlling the heating system by means of an indoor thermostat independently of outdoor temperature, is thus avoided.

One preferred embodiment of the invention therefore comprises a temperature-sensitive electrical make and break device contained in a suitable housing located on the exterior of a building, within which housing additionally are disposed one or more electrical heating elements in heat radiating relation to the temperature-sensitive elements of such thermostatic device. In the electrical circuit of the heating elements are placed one or more elements of electrically conductive resistance material disposed in heat-exchange contact with the stated control element, such resistance elements, when employed in plurality, being disposed along the path of flow of heat medium through the stated radiator. It has been found that by selecting a radiator or equivalent heat exchanger as the control element, a substantially straight line relationship between outdoor temperature and radiator temperature may be attained by disposing the greater portion of the total resistance value of such elements at or near the point of entrance of the thermal medium to the radiator. The temperature control system may be completed by providing suitable manually or automatically operable means for varying the total resistance of the circuit, and suitably establishing the outdoor thermostatic make and break device in an electrical circuit serving an automatic heat-flow valve, automatic combustion control, or the like which either instigates or controls the flow of thermal medium to and through the heating system. As is well understood, the outdoor thermostatic device may act as a make and break switch serving a suitable relay operative to perform the actual control operation of such valve or automatic device.

Desirably, but not necessarily, a second outdoor temperature-responsive thermostatic device may be employed, such device serving to control a heating element in the first-mentioned outdoor thermostat. By employing such auxiliary control thermostat, increase of accuracy of control is obtained; additionally, such thermostat may serve as a limit switch to positively shut off the automatic valve or the like in the event that the outdoor temperature rises above a predetermined point.

It will be understood that under particular operating conditions, some part of the heating system other than a radiator may be selected as the basis for control, such selection being in accordance with accepted heating principles, well understood by those skilled in the art.

Further features and objects of the invention will be more fully understood from the following detail description and the accompanying drawings, in which:

Fig. 1 is a schematic and partly diagrammatic view indicating typical forms of the invention;

Fig. 2 is a diagram of the electrical circuit of a preferred arrangement typified in Fig. 1;

Fig. 3 is a diagram indicating illustrative, i. e., typical, temperatures of the control elements on a selected radiator, plotted as abscissae in relation to outdoor temperatures plotted as ordinates, for each of three desired building temperature conditions;

Fig. 4 is a schematic view of a typical multi-room structure served by a heating system embodying the present invention, reference being directed to Figs. 1 and 2 for complete disclosure of the electrical circuit thereof; and Fig. 5 is a schematic wiring diagram showing a second arrangement of the outdoor thermostatic control devices.

In schematic view, Fig. 1 indicates the locations, outdoor and indoor, of elements of typical embodiments of the invention, one preferred embodiment being shown in electrical diagram in Fig. 2.

In carrying out my invention, as for example, for the control of the heating of a building or other structure comprising a relatively large number of rooms or other spaces served by radiators or equivalent heat exchange units of the heating system, any element of the heating system having a definite temperature relationship to other elements of the heating system may be selected as the "indoor" control point. The selection of such control point may be determined in accord with known principles of heating of multi-room buildings.

In the system indicated in Fig. 4, a radiator 10 supplied, for example, with steam as the heating medium, as through the indicated inflow piping 11, is employed as such control point. The heating system may include return piping indicated at 12; 12a represents a steam trap; 12b indicates a conventional shut-off valve, located at the inflow side of the radiator.

The radiator 10 may be any suitable unit of the building heating system, deriving its steam or other thermal medium from a main or supply pipe 11a common to other heat-exchange units 10a of the building. As will be understood, the radiation or heat-exchange values of each radiator should be so established with respect to the heat loss characteristics of the room or enclosure served, that sufficient heat is supplied to such room to maintain desired indoor temperature at the same predetermined outdoor temperature condition used is proportioning the radiation in the other rooms. Further, each radiator should be so proportioned that 100% capacity thereof affords sufficient heat emission for maintenance of such indoor temperature condition at the predetermined minimum outdoor temperature and weather condition.

The inlet valves of the radiators of the system may be provided with suitably sized orifices, calculated to compensate for the distance of travel of the steam and other factors known to those skilled in the art, to the end that adequate delivery of steam is assured to the most remote radiator. By the exercise of sound engineering practices, in conformity with the above, a partial "filling" of the control radiator 10 may represent a corresponding percentage of "fill" of other radiators in the system, and therefore the average temperature of radiator 10 may be characteristic of other radiators served by the common supply main 11a.

In Fig. 1, 14 represents a portion of an outer wall of a building equipped with the thermal system; 15 indicates the room or other space in which the selected, controlling radiator 10 is located, and 16 indicates the floor line of such room or space 15.

The control system includes a temperature-sensitive electrical make and break device 17, housed within a suitable enclosure 17' on the outside of the building wall 14. The selection of the proper location for thermostat 17 may accord with principles known to those skilled in the art. For example, if the heating system of the building is zoned, the thermostat should be suitably placed on the side of the building to which heat is supplied.

Thermostat 17 may be of any conventional type, such as bi-metallic, bellows, or pressure spring. Preferably, the thermostatic make and break thereof is snap-action, to prevent a condition of "fluttering" contact. As a simple form of thermostat, I have shown a temperature-sensitive bi-metallic element 18, electrically conducting, and an operatively associated fixed contact 19. It is understood that conventional adjustment means are provided to establish the temperature at which the element 18 moves into or out of electric circuit closing status.

Thermostat 17 may control, as by the electrical leads 20, 21, any suitable electrical valve or other device 22 for controlling the flow of heat through main 11a supplying the system of which the control radiator 10 is a component, or for controlling the actual generation of heat medium, as steam or hot water, by automatic combustion devices.

Such thermal medium control device 22 may be operated by employment of electrical energy furnished by any suitable electrical source, usually through a relay operated circuit, as is well known to those skilled in the art.

Referring to Fig. 2, in which the electrical circuit of my improved control system is diagrammatically shown, the circuit includes one or more elements, as 13, 13a, 13b, 13c, made of an electrically conducting material of which the electrical resistance value varies with the temperature of such material. Preferably, such material is of a type which has a lessened resistance on increase in temperature; such material is commonly known as a "negative" resistance material. It will be understood that other types of temperature-affected resistance materials may be used, such as so-called "positive" materials, with appropriate changes in the electrical circuit.

The stated resistance elements are shown as being in series electrical connection; such manner of connection has been found preferable, but a multiple connection may be employed with suitable alteration. In applying the stated resistance elements to the radiator, they should be electrically insulated therefrom but in advantageous heat-flow relation therewith. "Bakelite" or similar insulating mountings have been found satisfactory.

In series electrical connection with elements 13, 13a, 13b, 13c, and disposed within housing 17' so as to be in heat radiating relation to the sensitive element 18 of thermostat 17, there is provided a suitable heat-generating means, such as the pair of electrical heating coils 23, 24. It is preferred to use at least two such coils, as later explained, but a single coil of suitable heat-generating capacity may be employed. Conductors 29, 27 connect coil 23 to one lead of a source of substantially constant electrical potential, indicated at 26; lead wire 28 connects coil 24 to one of the plurality of negative resistance elements, as 13c. The major electrical circuit is completed by a connection 32 from element 13 to a rheostat or other resistance regulation device 33. The adjustable contact of such rheostat is connected, by a suitable conductor 34, to the second wire of the power source 26, completing the circuit.

Power source 26 may connect into the usual 110 volt building service. If alternating current serves the building, it is preferable to employ a transformer, as indicated at 26a, to suitably reduce the building service voltage, as from 110 to 30, for example, in the interests of simplifying the wiring of the system.

To afford a more accurate control, and to provide a means for positively shutting off the heat at its source, at or above a certain outdoor temperature, it has been found advantageous to use an auxiliary thermostat, as 25, mounted in a suitable housing 25' adjacent to, but thermally insulated from, housing 17'. Thermostat 25 may be of any suitable type, bi-metallic or bellows, and like thermostat 17, preferably makes or breaks electrical connection with a snap action.

As shown in Fig. 2, one of the elements of thermostat 25, as, for example its fixed contact 25a, is electrically connected to the junction of conductors 27 and 29. The temperature-sensitive element, 25b, of thermostat 25 may be electrically connected, as by conductor 30, to a point intermediate heating elements 23, 24.

The resistance value of the circuit of thermostat 25, including the leads effecting its connection to the major circuit, should be considerably less than the resistance value of heating element 23. In the circumstance of an open circuit at 25a, the path of current flow will be through heating elements 23, 24; with circuit at 25a closed, however, heating coil 23, because of its great resistance in comparison to that of the auxiliary thermostat system 25, will be electrically bypassed.

As typical of setting-point values for thermostats 17 and 25, it may be considered that thermostat 17 is set to open circuit—that is, blade 18 is set to move out of contact with element 18—at a temperature just above 100° F. The thermostat 25 is set so that the movable blade 25b moves to the right as viewed in Fig. 2 and electrically engages fixed contact 25a and closes the circuit when the outdoor temperature reaches and falls below 64° F., and the blade 25b moves to the left and out of engagement with 25a and opens the circuit when the outdoor temperature reaches 66° F.

Assuming the heating system to be in operation and an outdoor temperature of 70° F., it is generally desirable that radiator 10, and thus other radiators 10a in the system, be entirely without heat. With a "cold" radiator 10, i. e., a radiator having a temperature at or below the room temperature, the resistance of the major electrical circuit, inclusive of the resistance values of elements 13, 13a, 13b, 13c at "cold" status, and the heating coils 23, 24, may be so established that when the control circuit is connected to the external power source, the wattage available at the heating coils 23, 24 serves to raise the temperature of element 18 appreciably more than 30° F. The heating effect of the two coils 23, 24 adds to the 70° outdoor temperature, elevating the temperature of element 18 to a point appreciably greater than 100° F.—in other words, a temperature more than sufficient to maintain the thermostat 17, and hence circuit 20, 21, in open circuit status. Control means 22 being assumed to operate to close off thermal medium flow through the heating system under such open circuit condition, thermal flow to radiators 10, 10a, can not occur at this outdoor temperature condition.

Should the outdoor temperature drop from 70° F., the sum of the heat output of coils 23, 24, and the outdoor temperature begins to approach the circuit closing temperature of thermostat element 18. At 64° F. outdoor temperature, at which temperature thermostat 25 closes contact, heating coil 23 is shunted out of the circuit, and with the coil 24 being of calculated heat output insufficient alone to supplement the 64° F. outdoor temperature in maintaining the temperature of thermostatic element 18 at a point above 100° F., the thermostat will close circuit 20, 21, and through suitable action of control means 22, heat will be supplied to the heating system, inclusive of control radiator 10. As steam begins to enter radiator 10 through valve 12b, negative resistance element 13 will be warmed, and its resistance lowered. As the resistance of the major electrical control circuit is directly affected by a change in resistance of any one of its component elements, and as the potential at 26 is substantially constant, the current flow, i. e., amperage, is increased. The heating value at coil 24 being Watts=$I^2R$, element 24 emits increased heat. Such increased heat emission may be effective, additively to the existing outdoor temperature, to raise the temperature of blade 18 to above its circuit opening temperature, in which event flow of thermal fluid will cease.

Should the temperature continue to fall, and at a rate faster than the rate of temperature increase at the surface of radiator 10, the heating of a second negative resistance element, 13a, additionally reduces the overall resistance of the circuit to afford increased heat output of the coil 24.

With a continuing drop of outdoor temperature beyond the capacity of heating coil 24, as established by the hot, and therefore minimum resistance, characteristic of elements 13, 13a, to elevate the temperature of element 18 to its circuit-opening point, the thermal medium will continue to flow into the radiator, warming additional of the resistance elements, thus additionally reducing the overall resistance of the electric circuit and increasing the heat output of coil 24. In severe outdoor weather, the flow of thermal medium into the radiator may continue, until control radiator 10 and radiators 10a reach, and are maintained at, substantially completely filled condition at the predetermined minimum outdoor temperature at which the heating system is designed to heat the building or enclosure to the desired temperature. Assuming this minimum outdoor temperature to be zero degrees F. when completely filled radiators are desired, the resistance of the electrical circuit is suitably proportioned that when the control radiator 10 is completely filled, the current flow through heating coil 24 provides sufficient heat emission from coil 24 to heat thermostat element 18 to a temperature of approximately 100° F. The maximum surface temperature of a radiator is limited by factors well known in the art, and therefore, with a completely filled radiator 10, the circuit may be so adjusted as to maintain the temperature of thermostat element 18 at a point not more than 100° F. at zero degrees outdoor temperature.

Should the outdoor temperature rise, the increased outdoor temperature, adding its heating effect to the heat output of coil 24, raises the temperature of thermostat element 18 sufficiently to open the circuit 20, 21, and actuate control 22 to stop flow of thermal medium to the heating system. As radiator 10, and therefore elements 13, 13a, 13b, 13c, begin to cool, the increased resistance of the circuit reduces the wattage through coil 24, and reduces its heating effect. Under this circumstance, the element 18 may again close circuit, or, the outdoor temperature may have risen to a point at which further cooling of elements 13, 13a, 13b, 13c is required before the heat output of coil 24 is reduced to a point at which its heat effect, plus the heat effect of the outdoor weather, is insufficient to maintain element 18 in open-circuit condition.

It is evident, therefore, that the temperature of the control radiator 10 and of other radiators 10a may be definitely varied from "cold" status at a 65° to 70° F. outdoor temperature to a completely filled condition at a predetermined minimum outdoor temperature.

As the outdoor temperature rises to 66° F. or above, the circuit controlled by thermostat 25 will open, placing coil 23 in series with coil 24. The combined heat output of 23 and 24 will quickly elevate the temperature of thermostat element 18 within housing 17 to above the 100° F. point, and heat supply to radiator 10, and consequently to other heating units of the system, will immediately cease.

Thermostat 25, while obviously not essential to the operation of the control system, finds particular utility in the use of my improved temperature control system for residence or other building temperature control, in which it may be uneconomic or impossible to design a heating system which will function with precise accuracy. In such installations, it is desirable, from the point of view of the building operator, to have absolutely "cold" radiators with 70° outdoor temperature; further, in the average installation, no advantage is gained by supplying heat to the radiators until the outdoor temperature falls below 65° F. Thermostat 25 therefore acts as a limiting device for establishing an outdoor temperature point above which heat flow to the radiators 10, 10a is positively prevented.

Under certain conditions, as, for example, a commercial installation where the heat output of heat exchange units of the system may be established with a high degree of accuracy and other elements of the system held within close limits of design and installation, the heat output of a single coil, as 24, Fig. 5, may be suitably proportioned and established in relationship to element 18 of thermostat 17 and it alone provides the accuracy and positive type of control desired. In such an installation, the auxiliary thermostat 25 may be employed in the manner indicated in Fig. 5, i. e., as a thermally responsive switch connected in series in the circuit 20, 21, and set to open the circuit at a predetermined outdoor temperature, as 66° F. As shown, the blade 25b moves to the right and out of contact with the stationary contact 25a upon an increase in outdoor temperature beyond the predetermined temperature, 66° F. The series connection arrangement of thermostat 25 illustrated in Fig. 5 is merely typical; other known connections, involving two wire or three wire circuits, may be employed, depending upon the type of thermostat 25 or control 22 selected.

I have discovered that by suitably positioning the elements 13, 13a, 13b, 13c along the path of flow of heat medium through radiator 10, a substantially "straight line" relationship between average radiator temperature, as represented by the average temperature of the elements 13, 13a, 13b, 13c, and outdoor temperature, may be obtained. Such "straight line" relationship is indicated in Fig. 3, in which lines 40, 41, 42 are derived by plotting illustrative control element temperatures against outdoor temperatures, and represent three settings of rheostat 33, as presently described. A concentration of one-quarter or one-third of the total resistance of the stated elements at the first one-seventh of the radiator 10 is effective to produce a desired straight line relation.

Referring to Fig. 3, it may be considered that line 41 represents a radiator installation which is theoretically accurate, i. e., an installation in which the radiators, when completely filled, maintain the desired indoor temperature under conditions of predetermined minimum outdoor temperature. Line 41, therefore, indicates a "cold" radiator at an outdoor temperature approximately 65 to 70° F., and a completely filled radiator at zero degrees outdoor temperature. As above stated, the abscissa temperatures represent, not the surface temperature of the control radiator 10, but the average temperature of the control elements 13, 13a, 13b, 13c, which when positioned on the radiator surface in a manner electrically insulated therefrom, will obviously not reach the temperature of such radiator surface.

In practice, the condition is often met where the radiator installation is insufficient to produce a desired indoor temperature for the predetermined minimum outdoor temperature, such minimum outdoor temperatures being experienced only occasionally during the normal heating season. It is therefore desirable, and may be essential, to provide means whereby the radiator 10, and hence the other radiators 10a of the heating system, may be maintained at a warmer temperature condition during the mild or average outdoor weather condition, to offset such deficiency in actual radiation. A straight line temperature relationship between outdoor and control elements temperatures for such condition is illustrated by line 42, in which, by reference to the horizontal line established at approximately 55° F. it is indicated that a warmer radiator temperature condition is achieved than under a circumstance of theoretically accurate radiation. Similarly, line 40 may indicate a condition of excess radiation, for which circumstance a lower temperature of the control elements provides the wattage and resultant heat output of the heating elements in heat-radiating relationship to the thermostat blade 18 of thermostat 17, necessary to maintain the contact of 18 and 19 at the desired operating status for the predetermined minimum outdoor temperature.

It is a feature of the present invention that means are provided whereby the "straight line" temperature relationship may be altered, as indicated in Fig. 3, to accommodate for such varying conditions and efficiencies of heating installations.

As an example of such control means, I provide a variable resistance 33, suitably mounted and arranged for either manual or automatic adjustment, in series with the main electrical circuit. An adjustment of resistance 33 is effective to vary the upper point, i. e., the ordinate of the straight line temperature relationship, and also the slope of such line. It is seen from Fig. 3, that whereas the variation of the ordinate is within a comparatively limited range, the slope of the line is appreciably altered. Increasing the resistance at 33 automatically decreases the wattage output of the heating elements within the housing 17, and has the effect of raising the ordinate point from that represented by the line 41, for example, to that represented by the line 42 of Fig. 3. This results from the altered temperature condition within the housing 17', as when the heat output of the heating element decreases, the attainment of the set operating temperature for thermostat 17 must result from an increase in outdoor temperature. Also, the increase of resistance 33 so alters the entire resistance of the circuit that a change in resistance of one element thereof, such as a change in resistance of one or more of the elements 13, 13a, 13b, 13c has proportionally less effect. An increase of such resistance of 33 materially alters the slope of the straight line relationship between outdoor temperature and radiator temperature. Thus, while it is possible to maintain the intersection of the plotted temperature relationship line with the ordinate within a comparatively close range, the relationship of zero degrees outdoor temperature to average control radiator temperature may be appreciably changed, and a desired relationship of radiator temperature to outdoor temperature may be definitely established.

The adjustment of rheostat 33 may be controlled by a suitable timing device, in conformity with residential practice of maintaining a less temperature at night than during normal waking hours.

While I have illustrated my invention by a representation and description of a typical arrangement thereof, it will be understood that many changes may be made in the arrangement of component elements and in the electrical circuit within the spirit of the invention and the scope of the appended claims.

I claim:

1. Apparatus for controlling the temperature of a building space comprising a thermal element in heat-transfer relation with respect to said space and adapted to be supplied with a thermal medium; an enclosure located outside of said building space and in heat-dissipating relation with the outdoor atmosphere so that the rate of heat dissipation therefrom is determined partly by the outdoor temperature; electrical heating means for supplying heat to said enclosure; an electrical resistance element subjected directly to the temperature of said thermal element and being so constructed that the value of its resistance varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and the amount of heat supplied thereto varies in proportion to the temperature of said thermal element; and thermostatic means responsive to the enclosure temperature as affected by the amount of heat supplied by said electrical heating means and the rate at which heat is dissipated to the outdoor atmosphere, and operable to regulate the amount of thermal medium supplied to said thermal element in accordance with said enclosure temperature.

2. Apparatus for controlling the temperature of a building space comprising a thermal element in heat-transfer relation with respect to said space and adapted to be supplied with a thermal medium; an enclosure located outside of said building space and in heat dissipating relation with the outdoor atmosphere so that the rate of heat dissipation therefrom is determined partly by the outdoor temperature; electrical heating means for supplying heat to said enclosure; an electrical resistance element subjected directly to the temperature of said thermal element and being so constructed that its resistance value varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and the amount of heat supplied thereto varies in proportion to the temperature of said thermal element; thermostatic means responsive to the enclosure temperature as affected by the amount of heat supplied by said electrical heating means and the rate at which heat is dissipated to the outdoor atmosphere, and operable to regulate the amount of thermal medium supplied to said thermal element in accordance with said enclosure temperature; and a second thermostatic means responsive to outdoor temperature and operable to prevent the supply of thermal medium to said thermal element, when the outdoor temperature attains a predetermined value where temperature regulation within said space is not desired.

3. Apparatus for controlling the temperature of a building space comprising a thermal element in heat-transfer relation with respect to said space and adapted to be supplied with a thermal medium; an enclosure located outside of said building space and in heat-dissipating relation with the outdoor atmosphere so that the rate of heat dissipation therefrom is determined partly by the outdoor temperature; electrical heating means for supplying heat to said enclosure; an electrical resistance element subjected directly to the temperature of said thermal element and being so constructed that its resistance value varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and the amount of heat supplied to said enclosure varies in proportion to the temperature of said thermal element; thermostatic means responsive to the enclosure temperature as affected by the amount of heat supplied by said electrical heating means and the rate of heat dissipation to the outdoor atmosphere, and operable to regulate the amount of thermal medium supplied to said thermal element in accordance with said enclosure temperature; and a second thermostatic means in said electrical circuit and operable to increase the heat output of said electrical heating means when the outdoor temperature attains a predetermined value where temperature regulation within said space is not desired.

4. Apparatus for controlling the temperature of a building space comprising a thermal element in heat-transfer relation with respect to said space and adapted to be supplied with a thermal medium; an enclosure located outside of said building space and in heat-dissipating relation with the outdoor atmosphere so that the rate of heat dissipation therefrom is determined partly by the outdoor temperature; electrical heating means for supplying heat to said enclosure; an electrical resistance element subjected directly to the temperature of said thermal element and being so constructed that its resistance value varies in proportion to its temperature; a constantly energized electrical circuit connecting said electrical heating means and said electrical resistance element so that heat is continuously supplied to said enclosure and the amount of heat supplied thereto varies in proportion to the temperature of said thermal element; thermostatic means responsive to the enclosure temperature as affected by the amount of heat supplied by said electrical heating means and the rate at which heat is dissipated to the outdoor atmosphere, and operable to regulate the amount of thermal medium supplied to said thermal element in accordance with said enclosure temperature; and a second thermostatic means operable to render said first thermostatic means ineffective to control the supply of thermal medium when the outdoor temperature attains a predetermined value where temperature regulation in said space is not desired.

5. Apparatus for maintaining the temperature of a building space within a relatively narrow range and comprising a thermal element in heat-transfer relation with respect to said space and adapted to be supplied with a thermal medium; an enclosure located outside of said building space and in heat-dissipating relation with the outdoor atmosphere so that the rate of heat dissipation therefrom is determined partly by the outdoor temperature; a first electrical heating element arranged to supply heat to said enclosure; an electrical resistance element subjected directly to the temperature of said thermal element and being so constructed that the value of its resistance varies in proportion to its temperature; an electrical circuit including means for constantly energizing the same during the period when the outdoor temperature is below a value where temperature regulation in the building space is desired and said circuit connecting said first electrical heating element and said electrical resistance element so that during such period heat is continuously supplied to said enclosure in amounts varying in proportion to the temperature of said thermal element; thermostatic means responsive to enclosure temperature as determined by the amount of heat supplied to said enclosure and by the rate at which heat is dissipated to the outdoor atmosphere, and operable to regulate the amount of thermal medium supplied to said thermal element in accordance with said enclosure temperature; a second electrical heating element arranged to supply heat to said enclosure; and a second thermostatic means responsive to outdoor temperature and operable to connect said second electrical heating element into said electrical circuit when outdoor temperature reaches a predetermined point where temperature regulation in said space is not desired.

6. Apparatus for maintaining the temperature of a building space within a relatively narrow range during the heating season and comprising a heat-emitting element disposed to transmit heat to said space and adapted to be supplied with a heating medium; an enclosure located outside of said building space and in position to dissipate heat to the outdoor atmosphere; electrical heating means arranged to add heat to said enclosure so that the enclosure temperature is above the outdoor temperature and so that heat is dissipated from the enclosure to the outdoor atmosphere at a rate which is determined by the amount of heat energy supplied by said electrical heating means and by the outdoor temperature; an electrical resistance element directly subjected to the temperature of said heat-emitting element and being so constructed that its resistance value varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and the amount of heat supplied varies in proportion to the temperature of said heat-emitting element; and thermostatic means responsive to the temperature of said enclosure and operable to vary the supply of heating medium to said heat-emitting element in direct proportion to the rate of heat dissipation from said enclosure.

7. Apparatus for maintaining the temperature of a building space within a relatively narrow range during the heating season and comprising a heat-emitting element disposed to transmit heat to said space and adapted to be supplied with a heating medium; an enclosure located outside of said building space and in position to dissipate heat to the outdoor atmosphere; electrical heating means arranged to add heat to said enclosure so that the enclosure temperature is above the outdoor temperature and so that heat is dissipated from the enclosure to the outdoor atmosphere at a rate which is determined by the amount of heat energy supplied by said electrical heating means and by the outdoor temperature; an electrical resistance element directly subjected to the temperature of said heat-emitting element and being so constructed that its resistance value varies in inverse proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and the amount of heat supplied varies in direct proportion to the temperature of said heat-emitting element; and thermostatic means responsive to the temperature of said enclosure and operable to vary the supply of heating medium to said heat-emitting element in direct proportion to the rate of heat dissipation from said enclosure.

8. Apparatus for maintaining the temperature of a building space within a relatively narrow range during the heating season and comprising a hollow heat-exchange element disposed to transmit heat to said space and adapted to be supplied with a heating fluid; an enclosure located outside of said building space and in position to dissipate heat to the outdoor atmosphere; electrical heating means arranged to add heat to said enclosure so that the enclosure temperature is above the outdoor temperature and so that heat is dissipated from the enclosure at a rate which is determined by the amount of heat supplied to the enclosure and by the outdoor temperature; a plurality of electrical resistance elements so constructed that their resistance values vary respectively in proportion to their temperatures and said resistance elements being connected in electrical series and distributed over said heat-exchange element in such a manner that their total electrical resistance varies in proportion to the average temperature of said heat-exchange element; an electrical circuit including means for constantly energizing the same during the period when the outdoor temperature is below a value where temperature regulation in the building space is desired and said circuit connecting said resistance elements and said electrical heating means so that during such period heat is continuously supplied to said enclosure and in amounts varying in proportion to the average temperature of said heat-exchange element; and thermostatic means responsive to the temperature of said enclosure and operable to vary the supply of heating fluid to said heat-exchange element in direct proportion to the rate of heat dissipation from said enclosure.

9. Apparatus for maintaining the temperature of a building space within a relatively narrow range during the heating season and comprising a heat-emitting element disposed to transmit heat to said space and adapted to be supplied with a heating medium; an enclosure located outside of said space and in position to dissipate heat to the outdoor atmosphere so that the rate of heat dissipated therefrom is determined partly by the outdoor temperature; electrical heating means arranged to add heat to said enclosure to raise the temperature of the latter to a predetermined control point which is above the outdoor temperature; an electrical resistance element directly subjected to the temperature of said heat-emitting element and being so constructed that its resistance value varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and in amounts varying in proportion to the temperature of said heat-emitting element; and thermostatic means responsive to the temperature of said enclosure as determined by the amount of heat supplied by said electrical heating means and by the rate of heat dissipation to the outdoor atmosphere, and operable to effect the supply of heating medium to said heat-emitting element when the temperature of said enclosure is below said predetermined control point and to prevent the supply of heating medium to said heat-emitting element when the temperature of said enclosure is above said control point.

10. Apparatus for maintaining the temperature of a building space within a relatively narrow range during the heating season and comprising a heat-emitting element disposed to transmit heat to said space and adapted to be supplied with a heating medium; an enclosure located outside of said space and in position to dissipate heat to the outdoor atmosphere so that the rate of heat dissipated therefrom is determined partly by the outdoor temperature; electrical heating means arranged to add heat to said enclosure to raise the temperature of the latter to a predetermined control point which is above the outdoor temperature; an electrical resistance element directly subjected to the temperature of said heat-emitting element and being so constructed that its resistance value varies in proportion to its temperature; an electrical circuit including means for constantly energizing the same during the period when the outdoor temperature is below a value where temperature regulation in the building space is desired and said circuit connecting said electrical heating means and said electrical resistance element so that during such period heat is continuously supplied to said enclosure and in amounts varying in proportion to the temperature of said heat-emitting element; an electrically operated device operable when energized to supply a heating medium to said heat-emitting element; a second electrical circuit for energizing said device; a switch for opening and closing said second circuit; and thermostatic means movable in response to enclosure temperature and operable to close said switch when the enclosure temperature is below said predetermined control point and to open said switch when the enclosure temperature is above said control point.

WILLIAM K. WALKER.